UNITED STATES PATENT OFFICE.

MONE R. ISAACS, OF PHILADELPHIA, PENNSYLVANIA.

ADHESIVE COMPOSITION.

1,192,783.

Specification of Letters Patent. Patented July 25, 1916.

No Drawing. Application filed July 6, 1914. Serial No. 849,248.

*To all whom it may concern:*

Be it known that I, MONE R. ISAACS, a citizen of the United States, and a resident of the city of Philadelphia, county of Philadelphia, and State of Pennsylvania, have invented certain new and useful Improvements in Adhesive Compositions, of which the following is a full, clear, and complete disclosure.

The object of my invention is to produce an adhesive compound, glue or sizing from casein or any other suitable proteid, and lime or other suitable earth hydroxid, of such a character that the composition in its original form is a dry powder or granular fluid containing all the different ingredients, and will so remain suitable or satisfactory for use even after exposure to either dry or moist air for a considerable period.

It has long been known that casein or other suitable proteids mixed with lime or other alkaline earth hydroxids produce excellent adhesives when water is added, said adhesives being especially differentiated from other casein adhesives by their strength and water-proof qualities. In various Letters Patent of the United States heretofore granted to me, such for instance as U. S. Patent No. 845,790, dated March 5, 1907, and No. 848,746, dated March 11, 1907, I have described certain methods of improving such adhesive compositions by using certain other substances, such as sodium fluorid and Portland cement, in conjunction with casein and lime. It is desirable, however, to increase the permanence or chemical stability of these adhesive compositions, as well as that of the simple lime-casein composition, and it has been heretofore attempted to accomplish this object in one of two ways, namely;—(1) by keeping the casein or other proteid, and lime or other hydroxid, in separate parcels or packages until the time when it is desired to produce the adhesive by mixing them with a suitable quantity of water; and (2) by adding to the composition composed of casein or other proteid and lime or other hydroxid, a relatively large amount of an inert substance, such for instance as talc, clay, etc., such amount being sufficient to substantially keep the particles of casein or other proteid, and of lime or other similar hydroxid, from coming in actual contact with each other. The first of the two ways above described is objectionable, by reason of the fact that it necessitates separate packages of the ingredients, and gives rise to those troubles incident to the improper mixing or proportioning of the ingredients in finally forming the adhesive composition by mixing the same in water; and the second is also objectionable by reason of the fact that the adhesive properties of the finished product are impaired by the inert mineral substances contained therein. I have discovered, however, that by combining with the composition composed of casein or other proteid, and lime or other similar hydroxid, a relatively small amount of certain organic substances, a composition may be obtained which does not deteriorate even after standing several months in open bags, and which will readily mix with water and form an excellent adhesive even after such a long time has elapsed. The organic substance which I have found to be particularly effective and efficient for the purpose is spirits of turpentine, but I do not wish to limit myself to this particular substance, inasmuch as other terpene liquids, such as pine oil, oil of camphor and similar liquids produce the desired result. By "terpene liquid" I here, and in my claims, mean any liquid, whether it be a chemical compound or a mixture, that contains a terpene, or any analogous liquid which is obtained by the distillation of a resin or resinous wood. These terpene liquids can be used with animal or vegetable proteids other than casein, such for example as with hide or bone glue, and they may be used with good results with alkaline earth hydroxids other than lime, such for example as barium hydroxids, strontium hydroxids, or a mixture of one or both of the same with lime in the casein composition.

In carrying my invention into practice I mix the turpentine or other terpene liquid with casein or other proteid, or I may mix the turpentine with the lime or other similar hydroxid, or I may mix a part of the turpentine with the lime and a part with the casein. As for the other ingredients of the composition, such for example as sodium fluorid and Portland cement, they may be mixed with the casein or with the lime before or after adding the turpentine, or they may be added after the turpentine and the lime and casein have been incorporated together. After the turpentine has been mixed with such ingredient or ingredients as may be selected, as above indicated, and the result or results reduced to the form of a homogeneous powder or granulated matter (to accomplish which it will often be necessary after stirring or mixing by machine, to run the mixture through a sieve and then stir well, or run again through the mixer), the resulting composition will be dry and homogeneous, and will form a glue or adhesive upon being mixed with the proper amount of water.

The amount of turpentine or other terpene liquid used in said composition may vary within wide limits but there should never be used a sufficient quantity to make the final product coherent. I find with one hundred parts by weight of casein and twelve parts by weight of lime, with or without sodium fluorid five parts by weight, and with or without Portland cement ten parts by weight, that from one quarter of one part to three quarters of one part by weight of spirits of turpentine or a similar amount of pine oil, will give very satisfactory results, but I do not wish to limit myself to these exact proportions, inasmuch as they will be varied considerably and still produce a satisfactory resulting combination.

Having thus described my invention, I claim and desire to protect by Letters Patent of the United States:

1. A composition of matter containing casein, an alkaline earth hydroxid, and a terpene liquid.

2. A composition of matter containing casein, lime, and a terpene liquid.

3. A composition of matter containing casein, lime, and spirits of turpentine.

4. A composition of matter for an adhesive, glue, or sizing, containing a proteid, an alkaline earth hydroxid, a terpene liquid, and sodium fluorid.

5. A composition of matter for an adhesive, glue, or sizing, containing a proteid, an alkaline earth hydroxid, a terpene liquid, sodium fluorid, and Portland cement.

6. A composition of matter for an adhesive, glue, or sizing, containing by weight a proteid substantially 100 parts; a terpene liquid substantially from $\frac{1}{4}$ to $\frac{3}{4}$ of 1 part, and alkaline earth hydroxid substantially 12 parts.

7. A composition of matter for an adhesive, glue, or sizing, containing by weight casein substantially 100 parts, spirits of turpentine substantially from $\frac{1}{4}$ to $\frac{3}{4}$ of 1 part, and lime substantially 12 parts.

8. A composition of matter for an adhesive, glue, or sizing, containing by weight casein substantially 100 parts, lime substantially 12 parts, sodium fluorid substantially 5 parts, and a terpene liquid substantially from $\frac{1}{4}$ to $\frac{3}{4}$ of 1 part.

9. A composition of matter for an adhesive, glue, or sizing, containing by weight casein substantially 100 parts, lime substantially 12 parts, sodium fluorid substantially 5 parts, Portland cement substantially 10 parts, and a terpene liquid substantially from $\frac{1}{4}$ to $\frac{3}{4}$ of 1 part.

10. A composition of matter for an adhesive, glue, or sizing, containing by weight casein substantially 100 parts, and a terpene liquid substantially from $\frac{1}{4}$ to $\frac{3}{4}$ of 1 part.

11. A composition of matter for an adhesive, glue, or sizing, containing by weight casein substantially 100 parts, and spirits of turpentine substantially from $\frac{1}{4}$ to $\frac{3}{4}$ of 1 part.

In witness whereof, I have hereunto set my hand this third day of July, A. D., 1914.

MONE R. ISAACS.

Witnesses:
ALSTON B. MOULTIN,
ALEXANDER PARK.